United States Patent [19]

Dougherty et al.

[11] 4,315,098

[45] Feb. 9, 1982

[54] INSULATIVE SPACER FOR A LOW TEMPERATURE COAXIAL CABLE AND COAXIAL CABLE INCLUDING THE SAME

[75] Inventors: John J. Dougherty, San Jose; Mario Rabinowitz, Menlo Park, both of Calif.; George Bahder, Edison, N.J.

[73] Assignee: Electric Power Research Institute, Inc., Palo Alto, Calif.

[21] Appl. No.: 60,394

[22] Filed: Jul. 25, 1979

[51] Int. Cl.³ .................. H01B 12/00; H01B 3/16; H01B 3/56; H01B 9/04
[52] U.S. Cl. .................. 174/15 S; 29/599; 29/828; 62/1; 62/10; 156/48; 174/28
[58] Field of Search .................. 428/65, 66, 131; 174/15 R, 15 S, 24, 27, 28, 99 R, 99 B, 111; 29/599, 828; 156/47, 48; 264/28, 81; 62/1, 10, 35

[56] References Cited

U.S. PATENT DOCUMENTS

| | | | |
|---|---|---|---|
| 2,045,754 | 6/1936 | Clark | 62/10 |
| 3,234,684 | 2/1966 | Bridges | 428/66 |
| 3,859,160 | 1/1975 | Marin | 428/65 |
| 3,896,247 | 7/1975 | Descleve et al. | 428/65 |
| 4,179,319 | 12/1979 | Lofdahl | 428/131 |
| 4,241,233 | 12/1980 | Bahder et al. | 174/15 S X |

FOREIGN PATENT DOCUMENTS 1212256  11/1970  United Kingdom ............. 174/15 S

*Primary Examiner*—Laramie E. Askin
*Attorney, Agent, or Firm*—Flehr, Hohbach, Test

[57] ABSTRACT

A coaxial electric power transmission cable has an inner conductor within an outer conductor with solid dielectric material provided in the space therebetween. The dielectric material is solid at operating temperatures but non-solid at ambient temperature. An insulative spacer is provided for maintaining the coaxial alignment. The spacer includes insulative material which is identical to the solid dielectric material and may include a solid insulative insert having a solidification point higher than the insulative material whereby at least approximate coaxial spacing may be maintained should the insulative material not be maintained as a solid.

8 Claims, 3 Drawing Figures

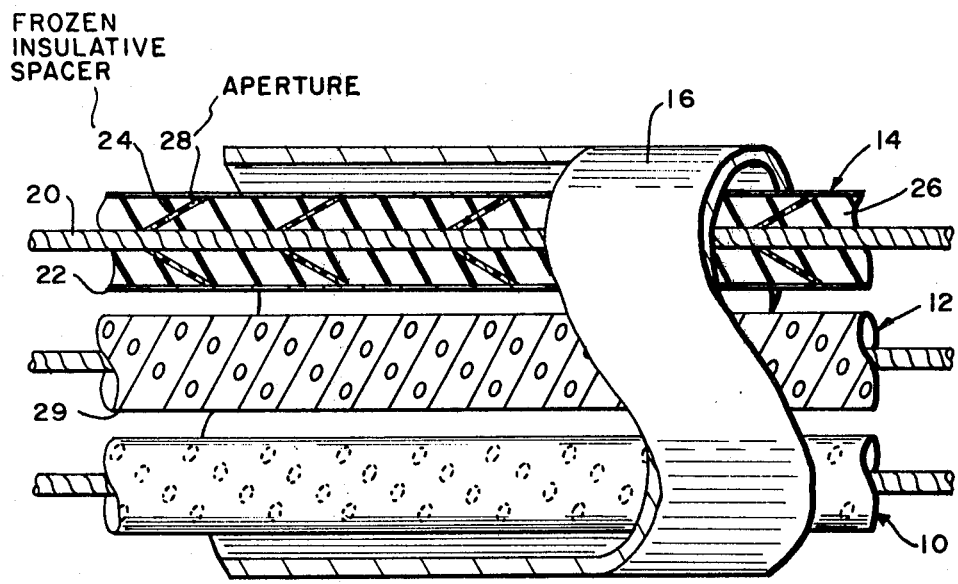
FIG.—1
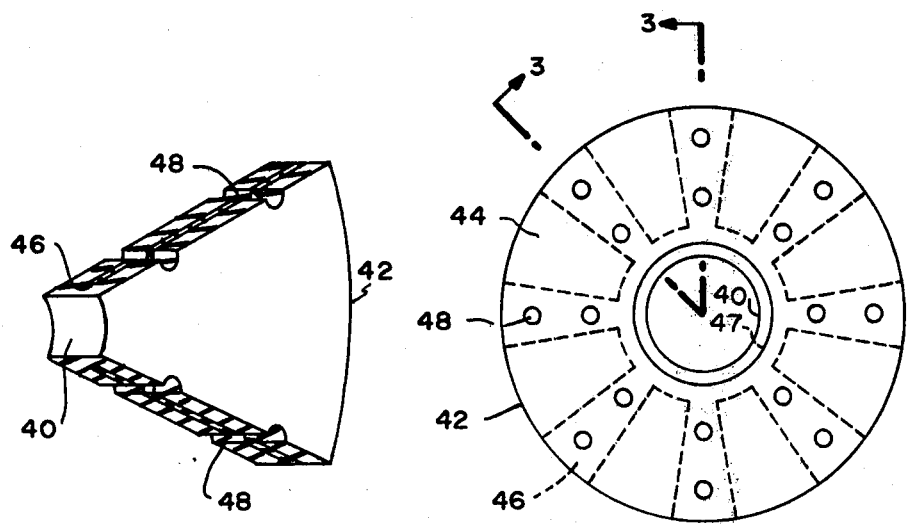
FIG.—3  FIG.—2

INSULATIVE SPACER FOR A LOW TEMPERATURE COAXIAL CABLE AND COAXIAL CABLE INCLUDING THE SAME

This application is related to co-pending application Ser. No. 928,269, filed July 26, 1978, now U.S. Pat. No. 4,241,233 issued Dec. 23, 1980 and assigned to the present assignee.

This invention relates generally to electrical cables, and more particularly the invention relates to coaxial power cables.

Electrical cables are often formed in a sheathed or coaxial arrangement with one conductor positioned within another conductor. A dielectric material provides electrical isolation between the inner and outer conductors. In low temperature cables a coolant or cryogen is provided to lower the temperature and the resistance of the cable and hence reduce the power loss within the cable. Typically, the cable is positioned within a cryogenic envelope with a liquid coolant surrounding the cable. Also, the inner conductor may be hollow with the coolant flowing therethrough.

Electrical cables operating under either ambient or cryogenic conditions require an insulator having high dielectric strength, low dielectric loss, proper mechanical properties, and reasonable cost. Heretofore, for low temperature cables a number of dielectrics have been employed with varying degrees of success. One approach has used the cryogen both as a coolant and as the dielectric. This approach has been largely unsuccessful because of the poor dielectric strength of most cryogens. Another approach has been to use a vacuum for both the electric and thermal insulation of the cable. While this removes the cryogen from the dielectric region, the use of a vacuum presents certain limitations including contamination of the entire line in case of a break at any point in the cable. In yet another approach, insulative tape has been wrapped on the conductors to provide a flexible cable insulation in the presence of a cryogen. However, the breakdown voltage of taped cables is a weak function of the dielectric strength of the tape and a stronger function of the dielectric strength of the cryogen which is present in the butt-gaps of the tape.

U.S. Pat. No. 4,241,233, supra, discloses an improved coaxial cable for power transmission applications and the method of assembling the cable in which the dielectric is formed from material which is solid at operating temperatures but non-solid at ambient temperatures. The inner cable is placed within the outer cable with spacer means provided to maintain coaxial alignment thereof. The space between the two conductors is filled with dielectric material in either liquid or gaseous form, and then the temperature of the dielectric material is lowered to solidify the material. In a cryogenic cable in which the inner conductor is hollow, the dielectric is advantageously formed beginning at the surface of the inner cable by passing the coolant through the inner conductor, whereby the dielectric forms with an absence of voids near the surface of the inner conductor where electric field strength is greatest. Further, the process of freezing the dielectric from the inner conductor outwardly also preferentially removes harmful impurities and imperfections outward away from the high electric field region. Accordingly, an improved coaxial cable is provided having high dielectric strength and low dielectric loss.

An object of the present invention is an improved spacer for a coaxial power cable of the type described.

Another object of the invention is a coaxial power cable of the type described in which the spacers and dielectric materials are compatible in electrical characteristics.

Briefly, in accordance with the invention, a coaxial cable having an inner conductor, an outer conductor, a solid dielectric material in a space between the two conductors, the dielectric material being solid at cable operating temperature and non-solid at ambient temperatures, is provided with insulative spacers for maintaining the inner conductor in coaxial alignment with the outer conductor and in which the spacers comprise insulative material which is identical to the dielectric material. The spacer material and the bulk dielectric must be substantially identical dielectrically and mechanically. The most compatible material for the spacer is the same substance as the frozen bulk dielectric. The spacer includes a centrally disposed opening for receiving the inner conductor and an outer peripheral configuration for mating with the inner surface of the outer conductor. Thus, the spacer and dielectric materials are compatible thereby minimizing difficulties arising from the spacer-dielectric interface.

In another embodiment the spacer further includes a solid insert within the solid insulative material with the insert comprising material having a solidification point higher than the insulative material whereby at least approximate coaxial spacing may be maintained between the inner conductor and the outer conductor in the event the insulative material is not maintained as a solid. Preferably, the insert includes a centrally disposed opening which is larger in diameter than the diameter of the inner conductor whereby the insert is spaced from the high electric field near the inner conductor. Means such as a plurality of openings in the spacer allows the flow of liquid and gas through the spacer.

In assembling the coaxial cable the solid insulative spacers are applied about the inner conductor while maintaining the temperature thereof near the solidification point of the insulative material. The inner conductor and spacers are then placed inside the outer conductor, and the space between the inner and outer conductors is filled with dielectric material in a non-solid state. Thereafter, the dielectric material within the outer conductor is solidified.

These and other objects and features of the invention will be more readily apparent from the following detailed description and appended claims when taken with the drawings.

In the drawings,

FIG. 1 is a view partially in section of low temperature cables in which the present invention is applicable.

FIG. 2 is an end view of a spacer in accordance with one embodiment of the present invention.

FIG. 3 is a cross-sectional view along the line 3—3 in the directions of the arrows of the insulative spacer illustrated in FIG. 2.

Referring now to the drawings, FIG. 1 is a view partially in section of low temperature cables disclosed in U.S. Pat. No. 4,241,233 and in which the spacer in accordance with the present invention is applicable. The coaxial cables 10, 12, and 14 are positioned within a cryogenic envelope 16 for three phase power transmission at low temperatures. The cables are shown in several forms for illustration purposes, and as used therein the term coaxial cable includes shielded and sheathed cables. A portion of envelope 16 is removed to illustrate the three cables therein. Cable 14 is shown in cross section and includes an inner conductor 20 supported within an outer conductor 22 by means of insulative frozen cone-shaped spacers 24. A solidified dielectric material 26 is provided in the space between the inner conductor 20 and the outer conductor 22. Spacer 24 has a plurality of holes 28 therein to facilitate the flow of dielectric material in the space between the inner and outer conductors during the manufacturing of the cable, as will be described further hereinbelow. Inner conductor 20 is preferably hollow and accommodates the flow of a low temperature coolant or cryogen therethrough. The cryogen is also provided in the space within envelope 16 not occupied by the three cables.

In the embodiment of FIG. 1, cable 10 is rigid and the inner conductor and outer conductor may be made of a continuous conductive material. Alternatively, the inner and outer conductors may be formed of a conductive tape 29 wrapped on a mandrel as illustrated by flexible cables 12 and 14. Rigid cables will normally be assembled when the cryogenic envelope is installed, while flexible cables are pulled through after assembly of the envelope. In the case of superconductive cables, the superconductive material, niobium-tin ($Nb_3S_n$) or niobium-germanium ($Nb_3G_e$), for example, may be provided on the outer surface of the inner conductors in tape form.

Referring now to FIGS. 2 and 3, an end view and sectional view of an insulative spacer in accordance with one embodiment of the invention is illustrated. The spacer is generally conical in shape and includes a centrally disposed opening 40 for receiving the inner conductor and has an outer peripheral configuration 42 for mating with the inner surface of the outer conductor. The body of the spacer comprises insulative material 44 which is identical to the solid dielectric material 26 in the cables of FIG. 1. In a preferred embodiment, the spacer also includes within the solid insulative material 44 an insert 46 which is shown in dashed lines in FIG. 2 for illustration purposes. The insert is a unitary piece having a centrally disposed opening 47 which is larger than the centrally disposed opening 40 whereby the insert is spaced from the inner conductor.

The spacer is provided with a plurality of holes 48 which allow the flow of liquid and gas through the spacer when assembling the coaxial cable.

Advantageously, the insert 46 comprises other insulative material having a solidification point higher than the solidification point of the insulative material 44 whereby at least approximate coaxial spacing may be maintained between the inner conductor and the outer conductor in the event that the insulative material 44 is not maintained as a solid. Following is an illustrative, but not all inclusive, list of fluid insulative materials which can be employed for the parts 44 and 46:

| FORMULA | NAME | LIQUIFICATION POINT °C. |
|---|---|---|
| Ar | Argon | −186 |
| $N_2$ | Nitrogen | −196 |
| $SF_6$ | Sulfur-hexafluoride | (sublimes at −64° C.) |
| $CO_2$ | Carbon dioxide | (sublimes at −79° C.) |
| $SClF_5$ | Sulfur chloride pentafluoride | −21 |
| $F_2NSF_5$ | Difluoramino sulfur pentafluoride | −18 |
| COS | Carbonyl sulfide | −50 |
| $N_2O$ | Nitrous oxide | −89 |
| $SOF_2$ | Thionyl fluoride | −44 |
| $CH_4$ | Methane | −162 |
| $CF_4$ | Carbon tetrafluoride | −128 |
| $CHClF_2$ | Chlorodifluoromethane | −41 |
| $CCl_2F_2$ | Dichlorodifluoromethane | −30 |
| $CClF_3$ | Chlorotrifluoromethane | −81 |
| $CBrF_3$ | Bromatrifluoromethane | −58 |
| $CF_3CF_3$ | Hexafluoroethane | −78 |
| $CClF_2CF_3$ | Chloropentafluoroethane | −39 |
| $CF_3CF_3CF_3$ | Octafluoropropane | −37 |
| $CH_2{=}CH \cdot CH_3$ | Propylene | −48 |
| $HC{\equiv}CH$ | Acetylene | −84 |
| $CF_3C{\equiv}CCF_3$ | Hexafluoro-2-butyne | −25 |
| $CF_3OCF_3$ | Bis (trifluoromethyl) ether | −59 |
| $(CF_2)_4$ | Octafluoro cyclobutane | −6 |
| $CF_3SCF_3$ | Bis (trifluoromethyl) sulfide | −22 |
| $CF_3SF_5$ | Trifluoromethyl sulfur penta fluoride | −20 |
| $SO_2$ | Sulfur dioxide | −10 |
| $CCl_4$ | Carbon tetrachloride | 76.8 |
| $CS_2$ | Carbon disulfide | 46.3 |
| $C_7F_{14}$ | Perfluoroheptene (also Perfluoromethylezchohexane) | |
| $C_4F_6$ | Hexafluorobutyne (also Hexafluorobutaliene) | |
| $C_8F_{16}$ | One, two-triofluoromethyl-decafluorocyclohexane | |
| $C_7F_8$ | Trifluoromethyl-penta fluorobenzene | |
| $isoC_4F_8$ | Perfluorobutene-2 | |
| $c\text{-}C_4F_8$ | Perfluorocyclobutane | |
| $C_6F_{10}$ | Perfluorocyclohexene | |
| $C_6F_{12}$ | Perfluorodimethylcyclobutane | |

In assembling the coaxial cable, the solid insulative spacers are applied about the inner conductor while maintaining the temperature thereof near the solidification point of the insulator. The inner conductor and spacers are then placed inside the outer conductor, and the space between the inner and outer conductors is filled with suitable dielectric material in a non-solid state. As in U.S. Pat. No. 4,241,233, the dielectric material is then solidified within the outer conductor and around the spacers with the solidification proceeding outwardly from the inner conductor. Preferably, the temperature is lowered by passing a liquid coolant or cryogen through the inner conductor of the coaxial cable thereby causing the dielectric material to solidify beginning at the outer surface of the inner cable thereby minimizing the formation of voids near the surface of the inner conductor where the electric field strength is greatest during power transmission. Further, the process of freezing from the inner radius outwardly also preferentially moves harmful impurities and imperfections outward away from the high electric field region.

Use of an insulative spacer in accordance with the present invention minimizes difficulties arising from the spacer-dielectric innerface and facilitates intimate contact of the dielectric with the spacer surface. While use of an insert within the spacer is preferred, use of an insert is not mandatory. Further, it will be appreciated that numerous configurations of a suitable spacer can be employed. Thus, while the invention has been described with reference to a specific embodiment, the description is illustrative of the invention and is not to be construed as limiting the invention. Various modifications and applications may occur to those skilled in the art without departing from the true spirit and scope of the invention as defined in the appended claims.

What is claimed is:

1. An insulative spacer for use in a coaxial cable having an inner conductor, an outer conductor, a dielectric material in the space between said inner and outer conductors, said dielectric material being a solid at cable operating temperature and a non-solid at ambient temperature, and means for maintaining the temperature of said dielectric material below the solidification point, said insulative spacer functioning to maintain the inner conductor in coaxial alignment with the outer conductor, said insulative spacer comprising first insulative material having a centrally disposed opening and an outer peripheral configuration, said first insulative material being a solid at cable operating temperature and a non-solid at ambient temperature, and an insert in said first insulative material, said insert comprising second insulative material which is a solid at cable operating temperature and a non-solid at ambient temperature and which has a solidification point higher than said first insulative material whereby when in use at least approximate coaxial spacing may be maintained between the inner conductor and the outer conductor of a coaxial cable in the event said first insulative material is not maintained as a solid.

2. An insulative spacer as defined by claim 1 wherein said insert includes a centrally disposed opening which is larger than said centrally disposed opening of said first insulative material.

3. An insulative spacer as defined by claims 1 or 2 and further including means for allowing the flow of liquid and gas through said spacer.

4. An insulative spacer as defined by claim 3 wherein said means for allowing the flow of liquid and gas through said spacer comprises a plurality of openings in said spacer.

5. A low temperature coaxial cable comprising an inner conductor, an outer conductor, a dielectric material in the space between said inner and outer conductors, said dielectric material being a solid at cable operating temperature and a non-solid at ambient temperature, means for maintaining the temperature of said dielectric material below the solidification point, and an insulative spacer for maintaining said inner conductor in coaxial alignment with said outer conductor, said spacer including a centrally disposed opening receiving said inner conductor and an outer peripheral configuration mating with the inner surface of said outer conductor, said spacer comprising a first insulative material which is identical to said dielectric material and an insert in said first insulative material, said insert comprising a second insulative material which is a solid at cable operating temperature and a non-solid at ambient temperature and which has a solidification point higher than said first insulative material whereby at least approximate coaxial spacing may be maintained between said inner conductor and said outer conductor in the event said first insulative material is not maintained as a solid.

6. A low temperature coaxial cable as defined by claim 5 wherein said insert includes a centrally disposed opening which is larger in diameter than the diameter of said inner conductor whereby said insert is spaced from said inner conductor.

7. A low temperature coaxial cable as defined by claims 5 or 6 and further including means for allowing the flow of liquid and gas through said spacer.

8. A low temperature coaxial cable as defined by claim 7 wherein said means for allowing the flow of liquid and gas through said spacer comprises a plurality of openings in said spacer.

* * * * *